United States Patent [19]
Enomoto et al.

[11] Patent Number: 5,974,401
[45] Date of Patent: Oct. 26, 1999

[54] DIGITAL PRINT ORDER AND DELIVERY METHOD AND SYSTEM

[75] Inventors: Jun Enomoto; Hiroaki Nakamura, both of Kanagawa, Japan

[73] Assignee: Fuji Photo Film Co., Ltd., Kanagawa, Japan

[21] Appl. No.: 08/922,239

[22] Filed: Sep. 3, 1997

[30] Foreign Application Priority Data

Sep. 4, 1996  [JP] Japan .................................. 8-234234

[51] Int. Cl.⁶ .................................................. G06F 17/60
[52] U.S. Cl. ............................ 705/40; 396/310; 396/549
[58] Field of Search .............................. 705/40; 396/310, 396/549

[56] References Cited

U.S. PATENT DOCUMENTS 5,327,526  7/1994  Nomura et al. ......................... 395/115
5,477,353  12/1995  Yamasaki ................................ 358/487
5,799,219  8/1998  Moghadam et al. .................... 396/319

FOREIGN PATENT DOCUMENTS 7-261279  10/1995  Japan .

Primary Examiner—Eric W. Stamber
Assistant Examiner—Akiba Robinson-Boyce
Attorney, Agent, or Firm—Sughrue, Mion, Zinn, Macpeak & Seas, PLLC

[57] ABSTRACT

According to the method and system of the present invention, digital image data is input in a personal computer, through an image input device. The order sender processes the image data with reference to a display on the screen of the personal computer, and then inputs print order data. The print order data includes print option data designating size and number of prints, expected delivery date data, delivery option data designating the way of delivery, and user ID data for identifying the order sender. Then an order receiver or a particular photofinisher is designated. The processed digital image data and the print order data are sent to the designated photofinisher. The reception processing device of the order receiver stores the digital image data and relating print order data, and commands a digital printer to make prints from the digital image data in accordance with the print order data.

14 Claims, 3 Drawing Sheets

DIGITAL PRINT ORDER AND DELIVERY METHOD AND SYSTEM

BACKGROUND OF THE INVENTION

1. Field of the Invention

The present invention relates to a method of ordering and delivering digital prints and a system therefor, which facilitates ordering digital prints and improves efficiency of printing and delivery of the digital prints at low cost without lowering print quality.

2. Background Arts

In the present photo-printing system, photographer or user has to go to a retail D.P.E. (Develop, Print & Enlarge) agent in order to have the exposed photo film developed and printed at a photo-finisher. Thereafter, the user has to go to the retail D.P.E. agent again on or after a designated delivery date to receive the finished prints and developed photo film. Accordingly, user has to go to the D.P.E. agent twice at every print order.

Recently there are a lot of 24-hour convenience stores, most of which double as the D.P.E. agent. Therefore, user can place a print order at any time and take the finished prints at any time after the designated delivery date. However, even if the user forwards the exposed photo film early in the morning, so long as photo-labs work in ordinary business hours, it is difficult to finish and deliver the photo-prints in shorter time.

Meanwhile, digital printing is getting popular these days as personal computers, digital cameras, image scanners and other high-tech digital imaging devices are getting widely used. Digital prints are made by processing image data on the personal computer and printing out hard copies through a personal-use printer of ink jet type or thermal type. The personal-use printer is not able to provide high print quality in comparison with professional printers. In addition, since the price of the personal-use printer is not so reasonable, the conventional digital print system turns out to be costly for most users.

SUMMARY OF THE INVENTION

In view of the foregoing, a prime object of the present invention is to provide a digital print order and delivery method and a system therefor, through which the user can order and receive digital prints with ease, and also the photofinisher can make the digital prints with ease in a shorter processing time from reception to delivery.

Another object of the present invention is to provide a digital print order and delivery method and a system therefor, which provide high quality prints at a lower cost.

To achieve the above objects, a digital print order and delivery method of the present invention is provided with the steps of sending digital image data and related print order data from an order sender to a reception processing device of an order receiver, storing the image data and the relating print order data in a memory device by the reception processing device, making digital prints based on the stored image data and print order data, and delivering the digital prints to the order sender.

A digital print order and delivery system of the present invention is provided with an image input device for inputting digital image data, a data processing device for processing the input digital image data while displaying the image data and for inputting print order data, a data transfer device for transferring the processed digital image data and the print order data, a reception processing device for receiving the transferred digital image data and print order data and executing a reception process, a storage device for storing the received digital image data and print order data, and a digital printer for making prints based on the stored digital image data and print order data, wherein the image input device, the data processing device and the data transfer device are provided on the side of the sender, whereas the reception processing device, the memory device and the digital printer are provided on the side of the receiver.

According to the method and system of the present invention, digital image data is fed in the data processing device, such as a personal computer, through the image input device, such as a digital camera, an image scanner, a computer graphics device (CG), or video capture. The order sender, i.e. a photographer or a user of the personal computer, processes the image data with reference to the image data or video image displayed on the screen of the personal computer, and then inputs the print order data. The print order data includes print option data designating size and number of prints, expected delivery date data, delivery option data designating the way of delivery, and user ID data for identifying the order sender. These data items are sequentially fed in the personal computer. Then the order receiver, i.e. a particular photofinisher, is designated, and data transfer command is entered, whereupon the processed digital image data and the print order data are sent to the designated photofinisher. The reception processing device of the order receiver, such as a large scale computer, stores the digital image data and the relating print order data, and commands a digital printer to make prints from the image data in accordance with the print order data.

Consequently, the user need not go to the D.P.E. agent, but can place an order for digital prints through personal computer after processing the image data as the user likes. On the side of photofinisher, it is possible to automate the management of the entire process from reception through printing to delivery, so that efficiency and speed of photofinishing is remarkably increased.

It is preferable to send at first pre-order data from the order sender to the order receiver, the pre-order data indicating data quantity of the image data and those data pieces of the print order data which are necessary for calculating the earliest possible delivery date and the charge for the ordered prints. According to this embodiment, the reception processing device calculates the print charge and the delivery date based on the pre-order data, and sends back data of the calculated print charge and delivery date to the order sender. In view of the charge and delivery date, the order sender can decide whether to pursue the print order or cancel it. When to pursue the print order, the order sender transfers the entire print order data, including the digital image data and the print order data, to the reception processing device. Then the reception processing device stores the entire print order data and sends a print command to the digital printer. The reception processing device also decides an accept number for managing the print order data, the digital image data and produced prints with reference to the accept number.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
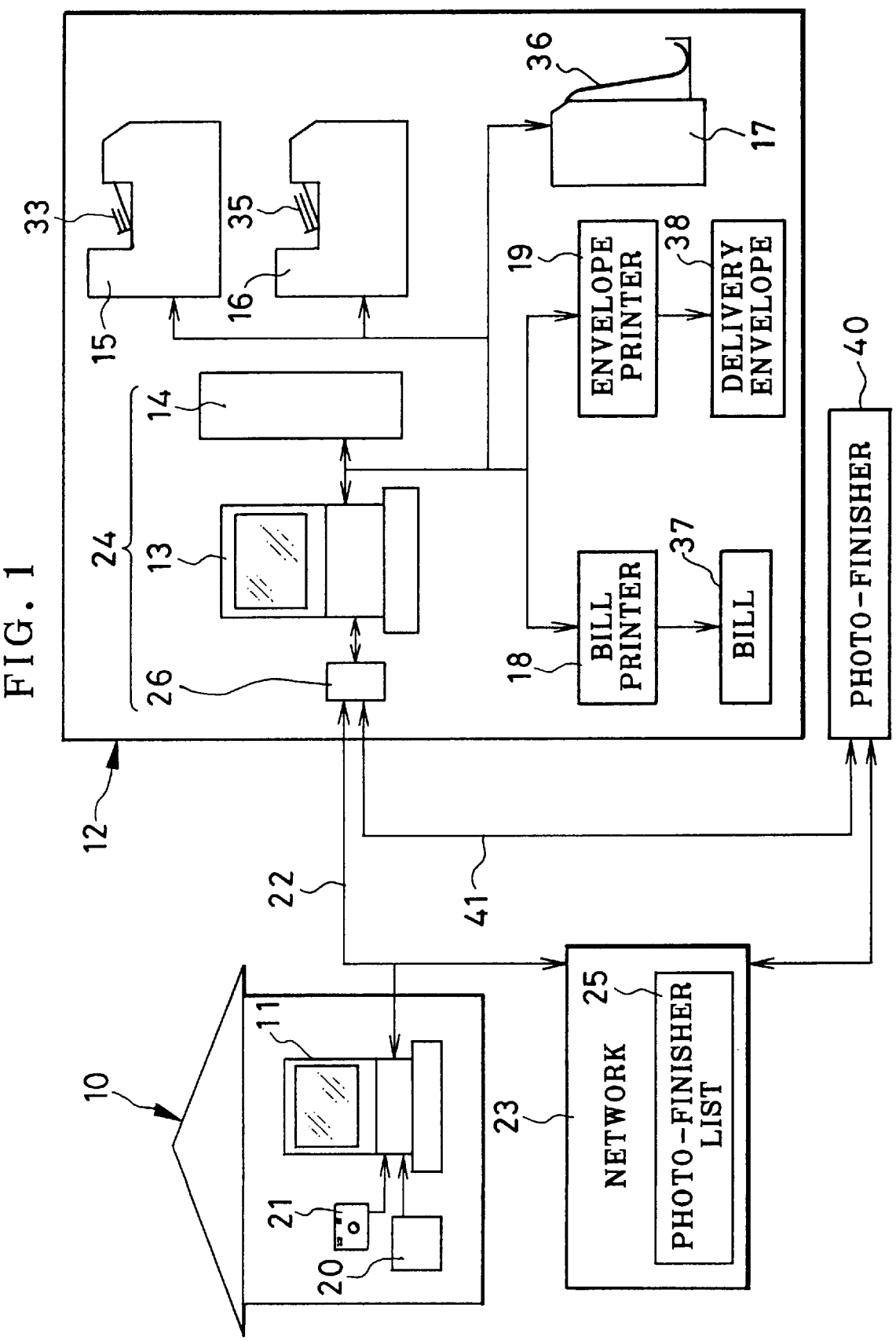
FIG. 1 is a schematic diagram showing the overall construction of a digital print order-delivery system of the present invention.

FIG. 1 is a schematic diagram that shows a digital print order-delivery system of the present invention. A personal computer 11 is provided on the side of a user 10 as an order sender. A work station 13 as a reception processing device, a large capacity memory device 14, digital printers 15, 16 and 17, a bill printer 18 and an envelope printer 19 are provided on the side of a photofinisher 12 as an order receiver.

The personal computer 11 on the side of the user 10 is constituted of the body of the personal computer, keyboard, display, hard disk device and modem, as is generally known. In addition, a scanner 20 and a digital still camera 21 are connected as image input means to the personal computer 11 of the user side 10. The modem is connected to a public telephone line 22 by cable or by radio. Through this public telephone circuit, the personal computer 11 is connected to a network 23 such as the Internet and a data base 24 of the photofinisher 12.

The scanner 20 is a flat-bed-type scanner. Through the scanner 20, image data is read from a reflective original of a photo print and printed materials. A film scanner can be used as a scanner, whereby the image data is read from photo film. Moreover, a video capture board is built into the body of the personal computer. Therefore, it is possible to take in the image data from a video tape recorder, a video camera and a television. Furthermore, the image data can be taken from the network 23 such as the Internet.

Image processing-ordering software is installed in the personal computer 11. As will be explained in more detail later, it is downloaded from the data base 24 of the photofinisher 12. The photofinisher 12 is selected from a photofinisher list, and this photofinisher list 25 is downloaded from the network 23. The image processing-ordering software is constituted of an order processing program combined with a well-known image processing program, so it is possible to carry out from the image processing to ordering. Instead of combining the ordering program with the image processing program, it is possible to install the order processing program alone. In that case, the image processing may be carried out by use of a commercially available image processing software.

The image processing program carries out taking in image data, γ-correction, color correction, trimming, data compositions for letter merge printing, magnification/reduction processing, and data compression. Format data of the data compression and compressed image data is stored in the memory of the personal computer as image data for print.

The order processing program is for input-processing of print order data and data transferring of the image data for print and the print order data.

In the input processing of print order data, the image data for print is specified and, thereafter, print option data, expected delivery date designation data, delivery option data, payment option data and user ID data are input in association with the specified image data. Once each data is input, it is stored, so the previous print order data is shown on the display in the next order. Therefore, re-input of common order data can be omitted in the next order.

The print option data is constituted of the data that designates print size, the number of prints, print format and print type. The print size data indicates E size, L size and cabinet size for silver-salt photo printers. In addition, it indicates A0 size, . . . A4 size and A6 size for ink jet printers and thermal printers. The print number data indicates the number of prints to be printed in each print size.

The print format data indicates an index print, a multi print, a seal print, a letter-composed print and a special size print such as a panoramic print. In addition, it indicates a monochrome print. The seal print is put on a releasing paper, and is used for putting on something after removing it from the releasing paper. The seal print is mostly used in combination with the multi print. The print type data indicates the silver-salt printer, ink jet printer, thermal printer and another type printer.

The expected delivery date designation data indicates an expected delivery date. Several kinds of dates are set up by a photofinisher in advance, and an appropriate one is selected from these options, e.g. a delivery within 12 hours after receiving order, a delivery within 24 hours after receiving order or a delivery within two days after receiving order. Instead of that kind of type, an expected delivery date can be designated. The delivery option data indicates the way of delivery, so an appropriate one is selected from several options, such as by mail, by a home delivery service or by hand-delivery at a retail D.P.E. agent.

The payment option data indicates the way of payment. If a delivery by mail or home delivery service is expected, payment by credit card, by prepaid card, by electronic money or by automatic transfer from user's account to photofinisher's account, or payment into photofinisher's account may be selected. In addition, payment in cash may be selected if hand-delivery is selected.

The user ID data is to identify the user, and is constituted of user's name, address, zip code, phone number and ID number. Once an order is accomplished or the user is registered before the order, a sequence of print order data is stored along with an order number such as order #1, order #2 . . . Next time, the user has only to input the user's ID number and password, to be connected to photofinisher's data base 24. After that, the image data and an order number are entered to place a print order in the same format as designated by the print order data stored with that order number. The order number is preferably registered as code, so that the stored print order data can be retrieved by entering the code.

The work station 13 on the photofinisher side 12 basically has the same composition as the personal computer 11 on the user side 10. However, it is constituted of a high-functional high-speed computer because of a larger amount of data to deal with. The well-known database software is installed in the work station 13 for reception. The data base 24 is constituted of the work station 13, the memory device 14 and a modem 26. The database software corresponds to the image processing-ordering software of the personal computer 11. By this ordering software, the personal computer 11 of the user 10 is connected to the work station 13 of the photofinisher 12 through the cable or radio telephone line 22 and the modem 26, and then a reception process is carried out.

The above-mentioned digital printers 15 to 17 are loaded with different sizes of photographic materials from each other, and with a recording medium, so that these printers 15 to 17 make prints in different sizes. The printers 15 and 16 are silver-salt type color digital printers, which make scanning-exposure of silver-salt color photo paper (called color paper) to optical image which is formed based on digital data. The printers 15 and 16 use positive-to-positive type color paper, which is exposed to a positive image.

Figure 2:
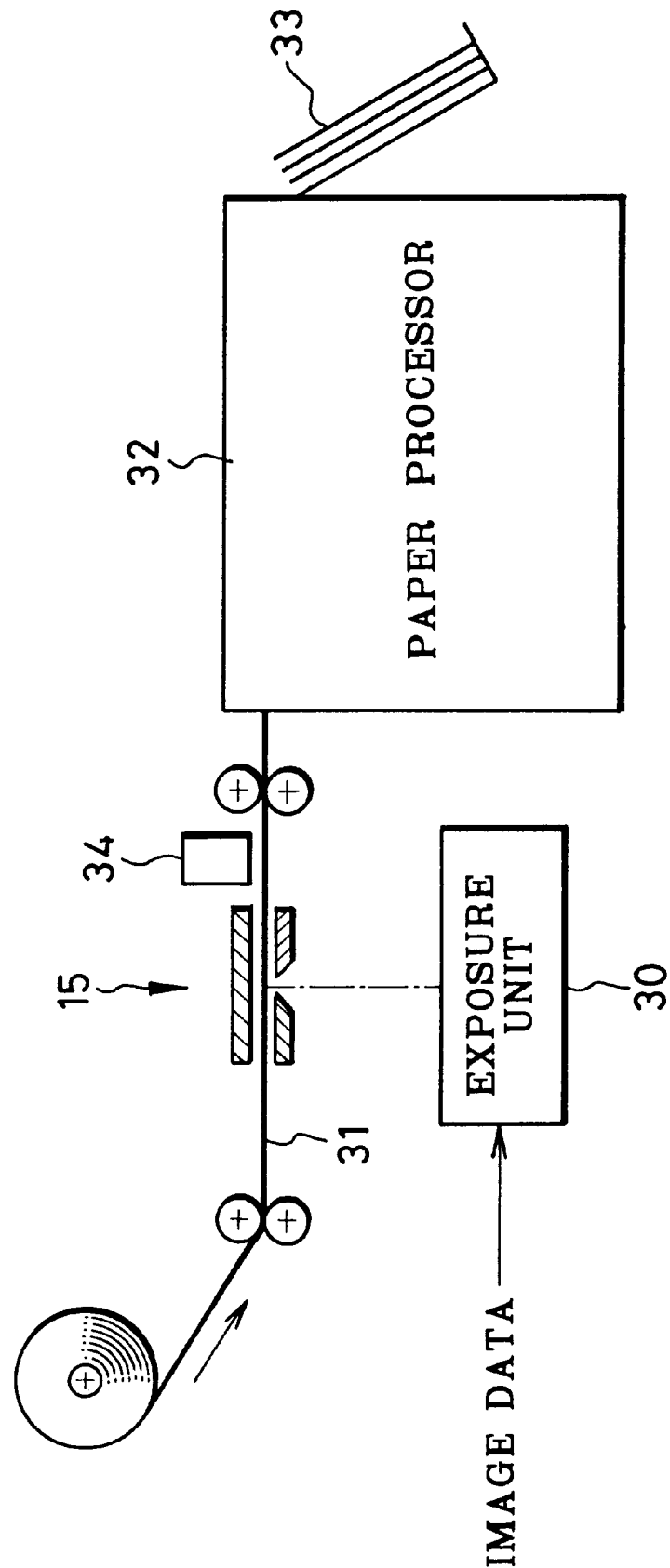
FIG. 2 is a schematic diagram of a digital printer.

As shown in FIG. 2, the silver-salt type color digital printer 15 is provided with an exposure unit 30 of Laser scanning-exposure type, which modifies the Laser beam based on the image data. Synchronously with transportation of color paper 31, scanning-exposure of each of yellow, magenta and cyan photo sensitive layers of the color paper 31 is carried out, to record each image on the color paper 31. The exposed color paper 31 is developed by a paper processor 32, then it is cut into individual frames based on cut marks. In this way, a print 33 of L size is made out. A back printer 34 is provided in the silver-salt type of color digital printer 15. The back printer 34 records an order accept number, a user ID number and bar codes of these numbers on the back of the color paper 31 corresponding to each image. The other silver-salt type color digital printer 16 has the same composition as the color digital printer 15. The printer 16 is loaded with color paper for cabinet size print, so as to make cabinet size prints 35.

The exposure unit 30 may be of two dimensional exposure type or of linear exposure type using CRT and LCD panel, instead of the Laser scanning-exposure type. Instead of modifying the light beam, it is possible to use a micromirror device for the scanning-exposure. The micromirror device is a device wherein small size micromirrors are arranged in a line or matrix, and which deflects incident light by controlling tilt angle of each micromirror.

If negative-to-positive type color paper is used, the image data is subjected to conversion from positive to negative. This posi/nega conversion is carried out in the image processing section of the digital printers 15 to 17, or it can be carried out in the image processing section of the work station 13. In the image processing section of the digital printers 15 to 17, γ-correction and matrix correction are carried out to make density and color balance of the consequent prints best.

The printer 17 is constituted of a well-known ink jet type color digital printer. When the print type option data of the user's order data designates ink jet type, the printer 17 is selected, and a large size print 36, such as A0 to A4 size, is made out. Therefore, many sizes of recording paper are set in the printer 17, and one recording paper is selected according to the designated size. The back printer is provided in the printer 17 too. An accept number, a user ID number, and those of bar code are recorded on the back of the recording paper.

As shown in FIG. 1, the bill printer 18 prints out a bill 37 based on the data available in the work station 13. The envelope printer 19 prints user's address, name and zip code on a delivery envelope 38.

As shown in FIG. 1, the data base 24 of photofinisher 12 is connected to data bases of other photo-labs or photofinishers 40 of the same group through the network 23 or a leased line 41. If an order for printing is beyond ability, or an order of impossible print size or format is expected, or any of the printers 15 to 17 breaks down, the data is sent to another photo-lab or photofinisher 40 of the same group. Then, the print processing and, if necessary, the delivery processing, are carried out by the photofinisher 40.

Figure 3:
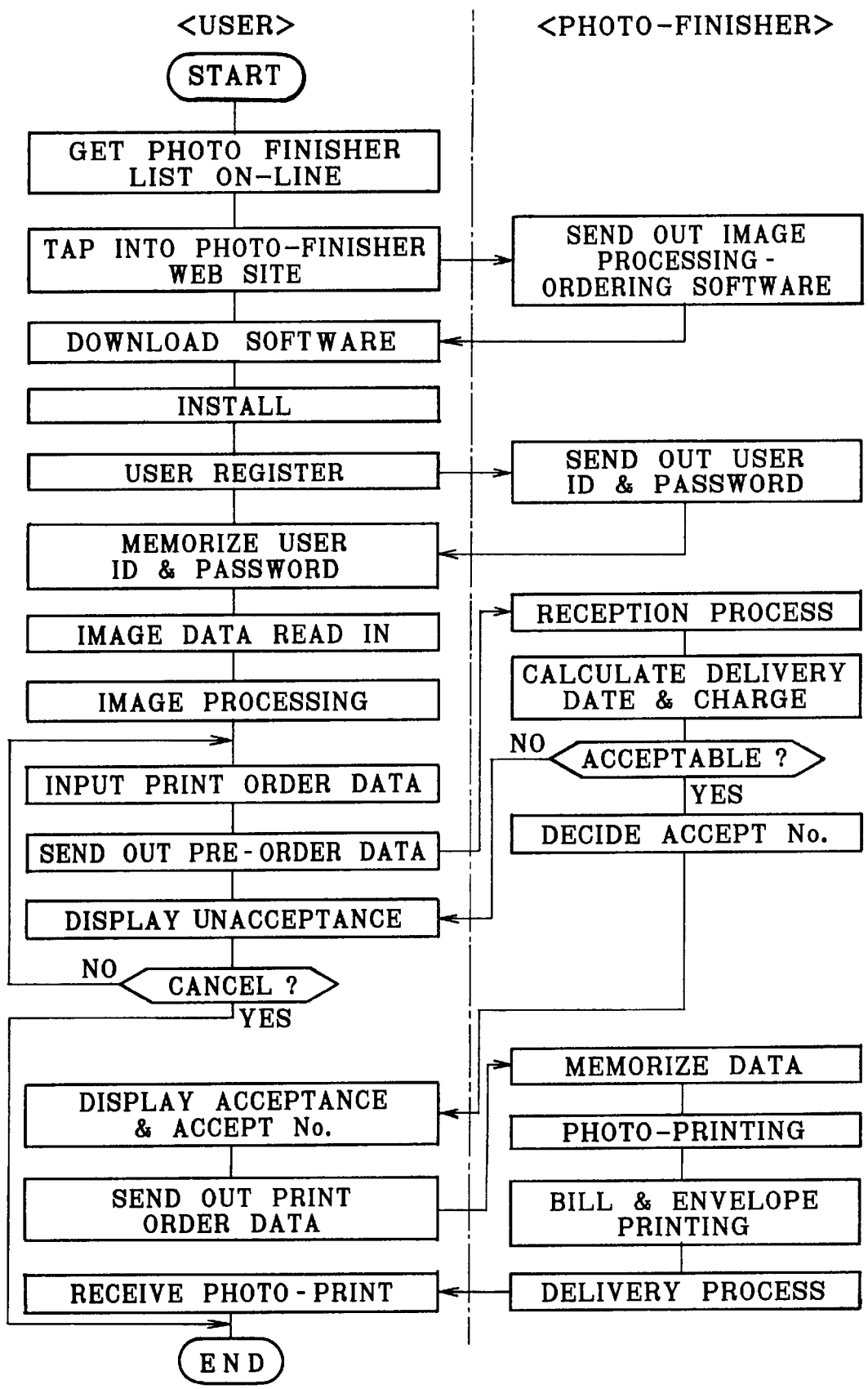
FIG. 3 is a flow chart illustrating the operation of the digital print order-delivery system.

Now the operation of the above embodiment will be described with reference to FIG. 3. The user 10 gets the list of photofinishers 25 on-line through the network 23 such as the Internet. The list 25 is obtainable by use of data communication software attached to the personal computer 11. Next, the user 10 selects the best photofinisher 12 from the list 25 taking into account which store is the nearest, what kind of print format is expected, how much the charge for print is, and what kind of delivery is possible, etc., and then taps into the Web site of the selected photofinisher 12 to connect to the data base 24 on the photofinisher side 12.

Upon user's request for downloading sent from the connected personal computer 11 on the user side 10, the work station 13 of the photofinisher 12 sends out the image processing-ordering software to the personal computer 11 of the user side 10. The user 10 extracts the downloaded image processing-ordering software and installs it in the personal computer 11. If the installation is accomplished normally, a user registration menu appears, which helps the user register for the print order.

In this user registration processing, the work station 13 publishes a user ID number and a password for the user 10. After that, the work station 13 can receive a print order just by checking these user ID number and password.

Next, the user 10 takes in the image data for print and carries out the image processing by using the image processing-ordering software. The image data is input into the personal computer 11 by the scanner 20, digital still camera and digital video camera without illustration. In addition, television images and video tape recorder images are input through a video capture board. Moreover, the image from the network 23 such as the Internet may be taken in as image data for print, if it is allowed to be printed.

The image data taken in is processed by the image processing-ordering software. Among the image processing techniques, for instance, there are γ-correction, matrix correction, illustration-letter composition, magnification/reduction processing, trimming and image composition. After the image processing is complete, the processed image data is compressed, for example, by JPEG (Joint Photographic Experts Group) compression. The compressed image data is written in the fixed area of RAM of the personal computer 10. Not only JPEG, but also other well-known type data compression method are applicable.

Next, the user inputs the print order data. It is carried out through selecting the expected option data on the data input screen by using a mouse or a keyboard. After the input of all print order data is accomplished, the computer 11 of the user 10 moves to a data transfer mode, then it is connected to the work station 13 of the photofinisher 12 and a print pre-order data is sent through the data communication.

The print pre-order data consists of the print option data, the expected delivery date designation data and data of image data size or data quantity. These data pieces are included in the print order data.

Since the total number of presently accepted orders and the delivery dates thereof are managed in the work station 13, it is possible to calculate the earliest possible delivery date and the charge for the ordered prints according to the image data size and the number of prints designated by the pre-order data from the user 10 taking into account of the number of orders from other users and the processing ability or capacity of the photofinisher side 12. The delivery date and the charge calculated based on the pre-order data are sent with an accept number to the user side 10. That is, the work station 13 checks whether the delivery will be in time for the expected delivery date or not with reference to the pre-order data, and also calculates the time necessary for photofinishing the ordered prints. By adding the time taken for photofinishing to the time taken for delivery, the earliest possible delivery date is calculated.

If the calculated delivery date exceeds the expected delivery date, the work station 13 sends a message of unacceptance to the personal computer 11 of the user 10. In that case, the user 10 may change the expected delivery date and send the pre-order again, or may cancel the order.

If the calculated delivery date is within the expected delivery date, the work station 13 sends the accept number and a message of acceptance to the personal computer 11 on the user side 10. The work station 13 also requires the personal computer 11 to forward the entire print order data.

The user 10 selects or designates the order execution after confirming the delivery date and the charge on the screen, then the personal computer 11 sends the entire print order data to the work station 13. The entire print order data is constituted of all the print order data and the image data for print. The work station 13 controls the entire print order data based on the accept number, and stores it into the memory device 14.

The work station 13 makes prints in the order of delivery date based on the received print order data. At this time, the work station 13 selects one printer from the printers 15 to 17 based on the print option data, and makes prints based on the designated number of prints and print size. For instance, if the normal L size is designated, the printer 15 is selected to make L size prints 33. If the cabinet size is designated, the printer 16 is selected to make cabinet size prints 35. If the A3 size is designated, the ink jet printer 17 is selected to make A3 size prints 36. If the manual correction by operator is selected, the work station 13 selects a manual print processing within business hours, and does not carry out auto-printing. In this case, the operator carries out the image processing to provide the best density and color balance, then makes the prints 33, 35 or 36 by using the printer 15, 16 or 17. Also when those print sizes and print formats which are not available by auto-printing are selected, the manual print processing is carried out by the operator within business hours.

The back printer 34 of each printer 15 to 17 prints the accept number, the user ID number and the bar code of these numbers on the back of each print 33, 35, 36. The accept number, the user ID number and the bar code are used to collate each print with a bill and a delivery envelope in the later delivery processing.

A print processing of bill and delivery envelope is carried out in parallel with the photo-printing or before or after the photo-printing. In the bill printing, the work station 13 prints details of the charge, the accept number, the user ID number and the bar code of these numbers with a fixed format by using the bill printer 18, and issues a bill 37. Similarly, the work station 13 prints the user's zip code, address, name, phone number, category code of delivery, accept number, user ID number and bar code on the delivery envelope 38 by using the envelope printer 19. These zip code, address, name and so on, are specified based on the user ID number of the print order data. When the delivery envelope 38 has a transparent window, the print of address on the delivery envelope can be omitted by printing these on the bill 37. Different kinds of delivery envelopes 38 are prepared for different print sizes. For instance, for the big size print such as A0 to A3 size, a cylindrical envelope or pack is used. In place of direct printing on the delivery envelope 38, it is possible to print a label, and put the label on the delivery envelope 38.

Since the same accept number and bar code are recorded on the finished prints 33, 35 or 36, on the bill 37 and on the delivery envelope 38, these can be collated with one another based on the accept number and bar code. After packing, the way of delivery, such as mail, home delivery service or hand-delivery, is selected based on the category code of delivery. The packing may be carried out by hand with reference to the accept number, or automatically based on the bar code of accept number by reading it by a bar code reader. After packed automatically, the delivery envelopes 38 can be sorted out according to the way of delivery with reference to the category code.

The print charge is paid in the way the payment option data designates. For payment by a prepaid card, for instance, the user purchases the prepaid card from the photofinisher, and inputs the card's ID number as the payment option data. By doing so, the work station 13 makes prints without charging up to the limit of the prepaid card.

Storage time designation data for designating a storage time period of the image data can be added to the print order data. If the storage time designation data is input, the work station 13 preserves the image data in the memory device 14 during the designated period. In this period, the user can read and revise the image data. If the image data is required to be preserved by the storage time designation data, an extra charge for the data preservation is added to the bill.

Data designating writing of image data in a recording medium may be added to the print order data. In that case, designated image data is written in a selected recording medium such as DVD, MO, CD and FD. The image data is delivered to the user 10, if the recording medium becomes full or the user 10 requires to do so.

The above-mentioned personal computer 11 stores the photofinisher list 25 as a library, wherein a list of printer equipments, a charge table and a delivery date table are shown for each photofinisher. Therefore, the user 10 can selects the best photofinisher from the list 25. This photofinisher list 25 is renewed by downloading through the network 23 such as the Internet, so the latest list 25 is always available.

If the photofinisher 12 is also a photo-lab of photo film, the user 10 can request the photofinisher 12 to pick up image data by a film scanner from exposed silver-salt negative film when it is developed and processed at the photo-lab, and to store the image data in the memory device 14. In that case, the user 10 connects the personal computer 11 to the work station 13 of the photofinisher 12 based on the user ID number, and downloads the image data to the personal computer 11. After processing the downloaded image data, the user 10 inputs print order data to place an order for printing.

In the above embodiment, the silver-salt color digital printers 15 and 16 and the ink jet color printer 17 are used in the photofinisher side 12. Besides these, a thermal developing-transferring type color printer, any kind of color thermal printer, and any kind of color Laser printer are applicable. It is of course possible to use monochrome printer for making black-and-white prints.

It is possible to add data designating manual image correction as the print order data. In that case, the operator observes a video image simulating a finished photo-print, and corrects the image data so as to obtain optimal density and color balance. An extra charge for the correction will be added to the print charge.

The print format data of the print order data may includes data designating post card print. In that case, the user may select one of several options of phrases and composite patterns of the phrase into a picture, or may compose the image by themselves and transfer the composed image data to the photofinisher. Moreover, the user may transfer data of an address list to the photofinisher so as the photofinisher to print also the addresses onto the individual post cards. In that case, the user may request the photofinisher to mail the post cards to those addresses.

Thus, the present invention should not be limited to the above described embodiments. On the contrary, various modifications may be made by to those skilled in the art without departing from the scope of claims attached hereto.

What is claimed is:

1. A method of ordering and delivering digital prints comprising the steps of:

sending digital image data and related print order data from an order sender to a reception processing device of an order receiver, the print order data including user ID data having a user ID number;

storing the image data and the related print order data in a storage device by the reception processing device;

allocating an order number to the print order data and storing the print order data along with code data indicating the user ID number and the order number, so that the print order data may be retrieved from the storage device based on the code data;

making digital prints based on the stored image data and print order data; and delivering the digital prints to the order sender.

2. A method as claimed in claim 1, further comprising the step of inputting the digital image data through a digital camera, an image scanner, a computer graphics device or a video capture.

3. A method as claimed in claim 1, wherein the print order data further includes print option data designating size and number of prints to make, expected delivery date data designating an expected print delivery date, delivery option data designating the way of delivery, and wherein said user ID data is provided for identifying the order sender.

4. A digital print order and delivery system comprising:

an image input device for inputting digital image data;

a data processing device for processing the input digital image data while displaying the image data, the data processing device being also used for inputting print order data, the print order data including user ID data having a user ID number;

a data transfer device for transferring the processed digital image data and the print order data;

a reception processing device for receiving the transferred digital image data and print order data and executing a reception process;

the reception processing device allocating an order number to the print order data and storing the print order data along with code data indicating the user ID number and the order number, so that the print order data may be retrieved from the storage device based on the code data;

a storage device for storing the received digital image data and print order data; and a digital printer for making prints based on the stored digital image data and print order data, wherein the image input device, the data processing device and the data transfer device are provided on the side of an order sender, whereas the reception processing device, the storage device and the digital printer are provided on the side of an order receiver.

5. A system as claimed in claim 4, wherein the image input device includes a digital camera, an image scanner, a computer graphics device and a video capture.

6. A system as claimed in claim 4, wherein the print order data further includes print option data designating size and number of prints to make, expected delivery date data designating an expected print delivery date, delivery option data designating the way of delivery, and wherein said user ID data is provided for identifying the order sender.

7. A system as claimed in claim 6, wherein the data processing device produces pre-order data from the print order data and the digital image data and sends the pre-order data to the reception processing device, the pre-order data consisting of data of the image data size, the print option data and the expected delivery date data, whereas the reception processing device calculates delivery date and charge for prints based on the pre-order data and sends back data of the calculated delivery date and charge to the order sender, and thereafter the reception processing device commands the digital printer to make prints in response to entire print order data consisting of the digital image data and the print order data when the entire print order data is transferred from the order sender.

8. A system as claimed in claim 7, wherein the reception processing device gives an accept number to the pre-order data and sends data of the accept number to the order sender along with the data of the calculated delivery date and charge, and manages reception process and printing with reference to the accept number.

9. A system as claimed in claim 4, wherein the print order data includes payment option data for designating the way of payment for the prints among of several options including payment in cash, payment by credit card, by prepaid card, by electronic money, by automatic transfer from user's account to photofinisher's account, and payment into photofinisher's account.

10. A system as claimed in claim 4, wherein the print order data may include storage time designation data for designating a storage time of the digital image data in the storage device, and the reception processing device preserves the digital image data in the storage device for the designated storage time.

11. A system as claimed in claim 10, wherein the stored digital image data is addressed by the user ID data and is transferred to the data processing device in response to a request of the order sender.

12. A system as claimed in claim 4, wherein the print order data may include data of designating writing of the digital image data in a recording medium, upon which the reception processing device writes the digital image data in a designated recording medium.

13. A system as claimed in claim 4, wherein the data processing device memorizes a list of order receivers as a library.

14. A system as claimed in claim 13, wherein the list of order receivers is downloaded through a network.

\* \* \* \* \*